United States Patent [19]

Nonomura

[11] Patent Number: 5,729,356
[45] Date of Patent: Mar. 17, 1998

[54] FACSIMILE MACHINE

[75] Inventor: Yutaka Nonomura, Iwakura, Japan

[73] Assignee: Brother Kogyo Kabushiki Kaisha, Nagoya, Japan

[21] Appl. No.: 439,368

[22] Filed: May 11, 1995

[30] Foreign Application Priority Data

May 12, 1994 [JP] Japan .................................. 6-123027

[51] Int. Cl.⁶ ................................................... H04N 1/00
[52] U.S. Cl. ........................................ 358/434; 358/402
[58] Field of Search ................................. 358/402, 400, 358/407, 405, 434–439, 440

[56] References Cited

U.S. PATENT DOCUMENTS 5,291,302  3/1994  Gordon et al. ......................... 358/402
5,291,546  3/1994  Giler et al. ............................ 358/402
5,414,528  5/1995  Hatamura .............................. 358/402
5,523,854  6/1996  Hornsby ................................. 358/402

*Primary Examiner*—Edward L. Coles, Sr.
*Assistant Examiner*—Stephen Brinich
*Attorney, Agent, or Firm*—Oliff & Berridge

[57] ABSTRACT

Upon receiving a command for changing a forwarding number (Yes in S103), the present facsimile machine 1 receives the forwarding number (S105 –S108), and retains the received forwarding number in the EEPROM 18. Then, the present facsimile machine 1 dials the forwarding facsimile machine (S115). The present facsimile machine 1 prepares a cover page for indicating that the present facsimile machine is put into a condition capable of forwarding incoming image information (S116). The facsimile machine 1 transmits the cover page to the forwarding facsimile machine.

13 Claims, 6 Drawing Sheets

```
===  COVER PAGE  ===

TO : _____
     FAX:  0-0123456789

FROM: ABC COMPANY
      FAX:  0XXX-XXX-333
```

FIG. 7

=== COVER PAGE ===

COMPLETED PREPARING TO FORWARD INFORMATION.

FACSIMILE MACHINE

BACKGROUND OF THE INVENTION

1. Field of the Invention

The present invention relates to a facsimile machine and more particularly to a facsimile machine capable of forwarding information received from one remote facsimile machine to another remote facsimile machine.

2. Description of the Related Art

There has been a facsimile machine capable of receiving information from one remote facsimile machine and forwarding the information to a different target facsimile machine. The facsimile machine can be inputted with the telephone number of the target facsimile machine (to which information is to be forwarded) either directly using the operation panel of the facsimile machine or by remote control from the target facsimile machine.

The remote-control type of facsimile machine will be described below. In this example, a user has set a facsimile machine at location A (which will be referred to as a "facsimile machine A" hereinafter) to forward incoming facsimile messages to a facsimile machine at a location B (which will be referred to as a "facsimile machine B" hereinafter). Then, the user travels from the location B to a location C. Using the telephone furnished to facsimile machine at location C (which will be referred to as a "facsimile machine C" hereinafter), the user telephones the facsimile machine A. Once connected, the user uses the numeric pad of the telephone of the facsimile machine C to input a special number for commanding a change in target facsimile machine. The user then inputs the telephone number of the facsimile machine C to which the user wants information forwarded.

However, there has been known a problem with this type of facsimile machine in that users may incorrectly input the telephone number of the target facsimile machine. If the incorrect number is for a telephone line not connected to a facsimile machine, the facsimile machine will repeatedly telephone the inputted telephone number, annoying the owner of the telephone line. If the incorrect number is for a telephone line connected to a facsimile machine, information may be accidentally transmitted to an unknown person or irretrievably lost.

SUMMARY OF THE INVENTION

In an attempt to prevent this problem, numbers inputted using the numeric pad can be reproduced in an artificial spoken voice. For example, if the user inputs the number "0, 0, . . . " the facsimile machine will reproduce a voice that says, "Zero, zero, . . . " This allows the user to confirm the inputted number.

However, such "verbal" messages are easily misunderstood, so the user may not detect that he or she has inputted a telephone number incorrectly. Therefore, the problems described still remain.

Also, to produce the artificial voice requires addition of a voice circuit or special information for synthesizing the human voice. These raise the cost of the facsimile machine.

There is still another problem, in which even though a telephone number is correctly inputted, the facsimile machine will not forward incoming image information to the target facsimile machine. There is the case that the facsimile machine is connected to an internal switchboard through interoffice telephone line and that the facsimile machine is desired to forward incoming image information to a target facsimile machine via an outside telephone line. In order to forward image information to the target facsimile machine, the facsimile machine muse transmit a connecting signal, a number signal "0" for example, to control the internal switchboard to connect the facsimile machine to the outside line, before transmitting a telephone number of the target facsimile machine. However, because the conventional facsimile machine outputs the inputted telephone number as it is, the conventional facsimile machine cannot be connected to the desired target facsimile machine.

It is therefore an objective of the present invention to solve the above-described problems and to provide a facsimile machine which enables a user to confirm that the facsimile machine can forward incoming image information to a target facsimile machine designated by the inputted telephone number.

It is another objective of the present invention to provide an inexpensive facsimile machine with a forwarding function.

In order to attain the above objects and other objects, the present invention provides a facsimile machine capable of forwarding image information received from remote facsimile machines to a desired target facsimile machine, the facsimile machine comprising: reception means for receiving a telephone number of a target facsimile machine, to which image information is desired to be forwarded; storage means for storing the received telephone number of the target facsimile machine; telephone number signal generating means for generating a telephone number signal corresponding to the telephone number of the target facsimile machine stored in the storage means, to thereby connect a telephone line to the target facsimile machine; and confirmation image transmission means for transmitting to the target facsimile machine information on a confirmation image indicating that the facsimile machine is put into a forwarding slate capable of forwarding incoming image information transmitted from remote facsimile machines to the target facsimile machine.

BRIEF DESCRIPTION OF THE DRAWINGS

The above and other objects, features and advantages of the invention will become more apparent from reading the following description of the preferred embodiment taken in connection with the accompanying drawings in which:

FIG. 7 shows a cover page transmitted according to the second embodiment.

DETAILED DESCRIPTION OF THE PREFERRED EMBODIMENTS

Figure 1:
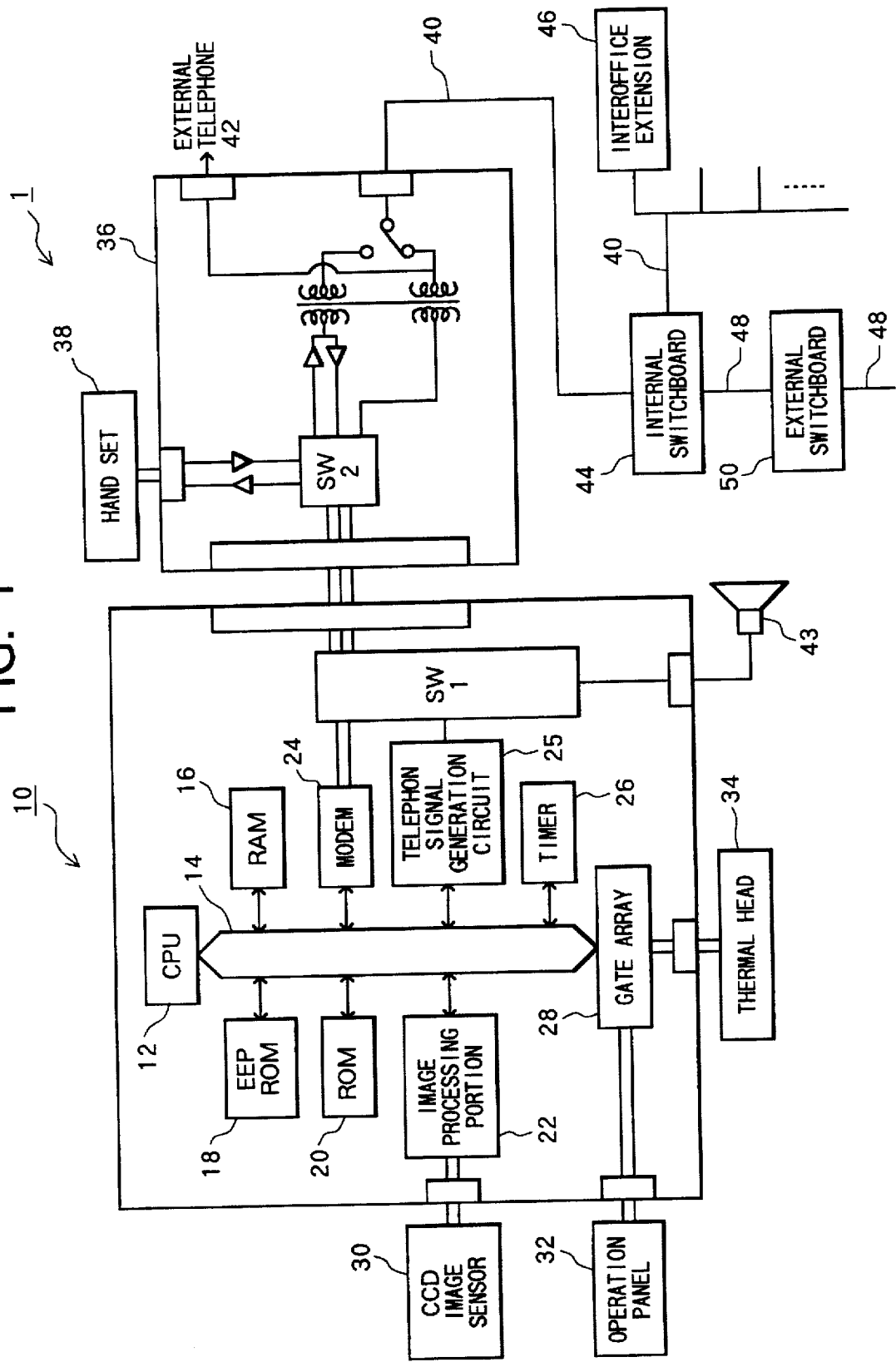
FIG. 1 is a block diagram of a facsimile machine of a first and second embodiments of the present invention.

A facsimile machine according to preferred embodiments of the present invention will be described while referring to the accompanying drawings wherein like parts and components are designated by the same reference numerals to avoid duplicating description. facsimile machine to which the incoming image information is to be forwarded. The telephone number of the target facsimile machine will be referred to as a "forwarding number" hereinafter. The ROM 20 prestores control programs such as various control routines for controlling the CPU 12. For example, the ROM 20 prestores a change forwarding number routine shown in FIG. 2 and an image forwarding routine shown in FIG. 4.

The image processing portion 22 is connected to a charge-coupled device (CCD) image sensor 30 for reading a document to be transmitted. The gate array 28 is connected to an operation panel 32 and a thermal head 34. The operation panel 32 is provided with a numeric pad and several function keys (not shown) for inputting various commands to the facsimile machine. The operation panel 32 is further provided with a liquid crystal display (LCD) for displaying various informations. The thermal head 34 is for recording image information onto recording sheets.

The modem 24 is connected to the NCU 36 via a switch SW1. The switch SW1 is also connected to the speaker 43. The switch SW1 is for switching in response to a command from the CPU 12 so that the modem 24 can be selectively connected to the NCU 36 or to the speaker 43.

The NCU 36 is for performing a dialing function and a signal detection function. The NCU 36 is for mediating A first embodiment will be described below with reference to FIGS. 1 through 5.

FIG. 1 schematically shows the configuration of electrical components of the facsimile machine 1 of the first embodiment. The facsimile machine 1 includes: a control portion 10; a network control unit (NCU 36; a speaker 43; and a handset 38.

The network control unit 36 is connected to an interoffice telephone line 40. The interoffice telephone line 40 is connected to an internal switchboard 44. Several numbers of interoffice extensions 46 are also connected to the internal switchboard 44. The internal switchboard 44 is connected to an outside telephone line 48. An external switchboard or telephone exchange 50 is connected to the outside telephone line 48.

The network control unit 36 is also connected to an external telephone 42.

The control portion 10 mainly includes a CPU 12: a RAM 16; a EEPROM (electrically erasable/programmable read only memory 18; a ROM 20; an image processing portion 22; a modem 24: a telephone number signal generation circuit 25; a timer 26; and a gate array 28 which are all connected to a bus line 14. The RAM 16 is for temporarily storing incoming image information from a remote facsimile machine. The EEPROM 18 is for storing data of telephone number of a target transmission and reception of information between the modem 24 and the telephone line 40. Among other functions, the NCU 36 transmits signals in a format suitable for the telephone line 40 and detects signals incoming over the telephone line 40. The NCU 36 is connected to the handset 38 so that a user of the facsimile machine can communicate with a remote facsimile machine.

A switch SW2 is provided to the NCU 36 for selectively connecting the interoffice telephone line 40 either to the modem 24, the handset 38, or the external telephone 42. When the switch SW2 is switched from the handset 38 to the modem 24, data inputted from the interoffice telephone circuit 40 can be inputted to the modem 24.

The modem 24 is for performing modulating/demodulating function. The modulating/demodulating function includes: modulating function for modulating digital signals into analog signals and outputting them to the interoffice telephone line 40 via the NCU 36; and demodulating function for demodulating analog signals inputted from the interoffice telephone line 40 into digital signals. The modem 24 may be further provided with a sound digitalization function and a sound reproducing function. The sound digitalization function is for converting analog sound data transmitted from the interoffice telephone line 40 into digital sound data. The sound reproducing function is for reproducing digital sound data into analog sound data.

The telephone number signal generation circuit 25 is for generating a telephone number signal (DTMF (dual tone multi-frequency) signal or dial pulse signal) when a forwarding number for a target facsimile machine is inputted. The following description will be given for an example that the circuit 25 generates a DTMF signal. That is, the telephone number signal generating circuit 25 generates a DTMF signal representative of the inputted forwarding number. The DTMF signal generated by the telephone number signal circuit 25 is transmitted to the interoffice telephone line 40 via the NCU 36. Receiving the DTMF signal, the external switchboard 50 will generate a ringing sequence to the target facsimile machine corresponding to the forwarding telephone number.

Because the present facsimile machine 1 is connected to the outside telephone line 48 via the internal switchboard 44, the forwarding number includes not only a telephone number of the target facsimile machine but also a number "0" and a pause code "*". The number "0" is for actuating the internal switchboard 44 to connect the facsimile machine 1 with the outside line 48. The pause code "*" is for ensuring that the signal generating circuit 25 outputs the DTMF signals for the telephone number only after when the facsimile machine 1 is connected to the external switchboard 50 via the outside telephone line 48. The forwarding number should further include an end code "TM" for indicating an end of the forwarding number.

It is noted that in order to transmit image information of a document read by the CCD image sensor 30 to a remote facsimile machine, a telephone number of a remote facsimile machine, to which the information is desired to be transmitted, can be manually inputted to the telephone number signal generating circuit 25 from the operation panel 32.

The speaker 43 is for outputting sounds such as ringing signals.

The CPU 12 is for controlling an entire portion of the facsimile machine. According to the present invention, the CPU 12 is for performing the change forwarding number routine of FIG. 2 and the image forwarding routine of FIG. 4 stored in the ROM 16. It is noted that the CPU continually executes the change forwarding number routine while power of the present facsimile machine 1 is ON. In other words, the CPU continually executes the standby state of S101 for waiting ringing signals. The CPU continually executes the image forwarding routine after the forwarding number is stored in the EEPROM 18. In other words, the CPU continually executes the standby state of S151 for waiting ringing signals after the forwarding number is stored.

The CPU 12 is further for encoding data of a document read by the CCD image sensor 30. The CPU 12 encodes the document data, according to the format of the remote facsimile machine (for example, to an MH (Modified Huffman), MR (Modified READ), or MMR (Modified MR) format), and then compresses the data. The CPU 12 is also for decoding incoming information into a form for output onto a recording sheet. That is, the CPU 12 decodes information received from a remote facsimile machine which has been encoded according to the encoding format of the remote facsimile machine, and outputs the decoded information to the thermal head 34.

In the present facsimile machine 1, a predetermined number, "954" for example, to be inputted from a remote facsimile machine or a remote telephone is allotted to a command signal to request change in the target facsimile machine to which information is desired to be forwarded.

Figure 2:
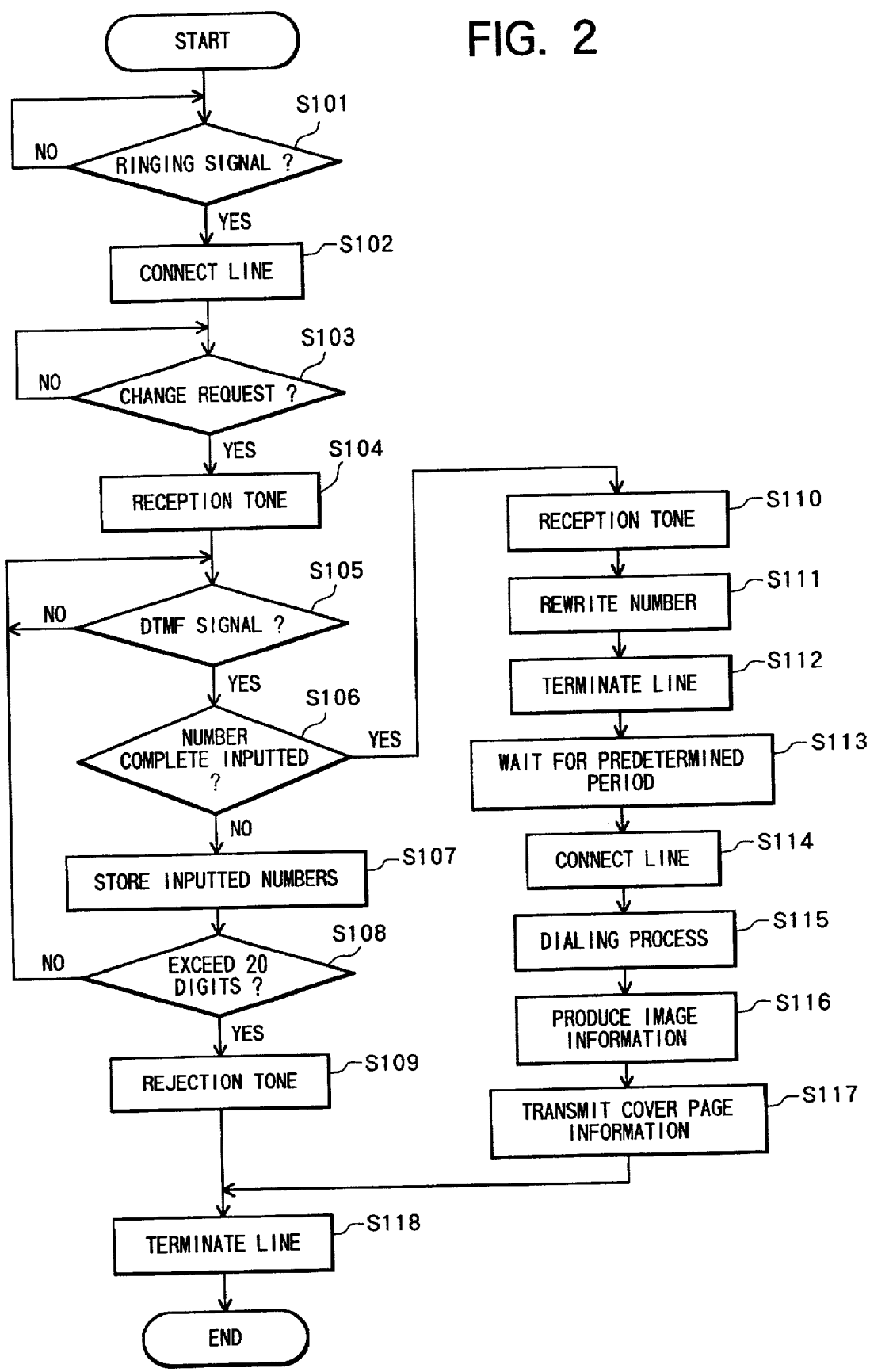
FIG. 2 is a flowchart of a change forwarding number routine.

With the above-described structure, the present facsimile machine 1 changes a forwarding number, by performing the change forwarding number routine of FIG. 2. According to the change forwarding number routine, the facsimile machine 1 changes the forwarding number, upon receiving the command signal from a remote facsimile machine for changing the target facsimile machine. After the forwarding number is thus changed according to the change forwarding number routine, the facsimile machine 1 performs the image forwarding routine of FIG. 4 so as to receive incoming image information and then to forward the image information to the new target facsimile machine.

These operations will be described below with reference to FIGS. 2 through 5. Now assume that a user has initially set the present facsimile machine 1 to forward incoming messages to a facsimile machine at location B (referred to as facsimile machine B hereinafter). That is, the telephone number of the facsimile machine B has been stored in the EEPROM 18. Then, the user's schedule requires him or her to go from location B to location C so that he or she must command the present facsimile machine 1 to forward incoming messages to a facsimile machine at location C (referred to as facsimile machine C hereinafter).

The change forwarding number routine will be first described below with reference to FIG. 2, assuming that the user transmits command to the present facsimile machine 1 from the facsimile machine C.

First, the user lifts the handset of facsimile machine C and dials the telephone number of the present facsimile machine. A ringing signal will be transmitted to the present facsimile machine 1 from the outside telephone line 48 and the interoffice telephone line 40. When the present facsimile machine 1 receives the ringing signal (i.e., S101 is YES), the CPU 12 controls the NCU 36 to connect with the telephone line 40 in S102 so that input from the telephone line 40 is possible.

Next, the user, at the facsimile machine C, requests a change in the forwarding number by inputting via the numeric pad the predetermined number, "954" for example. S103 therefore determines that a change in the forwarding number has been requested. The program therefore proceeds to S104 where the CPU 12 transmits a reception tone, generated by an internal oscillation circuit (not shown), to the facsimile machine C in S104. This reception tone informs the user at the facsimile machine C that the present facsimile machine 1 has acknowledged his or her request to change the target facsimile machine to which messages are to be forwarded and is prepared for input of the new forwarding number.

Using the numeric pad on the facsimile machine C, the user then inputs the telephone number of facsimile machine C. For example, the telephone number of facsimile machine C is 012-345-6789 (where 012 is an area code). Because the present facsimile machine 1 is connected via the internal switchboard 44 to the outside telephone line 48, the telephone number must be inputted with the number "0" for connecting the facsimile machine 1 to the outside line. Therefore, the user first presses "0" on the numeric pad. As a result, the facsimile machine C transmits the DTMF signal for the number "0" to the present facsimile machine 1. This produces a YES determination in S105, whereupon whether or not the telephone number has been completely inputted is determined in S106. At this point, only the number "0" has been inputted (i.e., S106 is NO) so that the program proceeds to S107, where the CPU 12 stores the inputted number "0" into the RAM 16. Because the number of digits that can be inputted to the present facsimile machine 1 is limited to a maximum of 20 digits, for example, S108 then judges whether or not the inputted telephone number has exceeded 20 digits. Because only the number "0" has been inputted at this stage (i.e., S108 is NO), the program returns to S105.

Before the user continues inputting the telephone numbers after inputting the number "0," he or she depresses the "*" key on the numeric pad to generate a pause signal (to be described later). The facsimile machine C outputs the DTMF signal for the "*" key, resulting in a YES determination in S105. The determination in S106 will again be NO at this point so that in S107 the CPU 12 stores the inputted mark "*" (pause signal) into the RAM 16. The determination in S108 will again be NO at this point so that the program returns to S105. Next, the user inputs the telephone number of the facsimile machine C, whereupon the inputted numbers "0*0123456789" will be stored in the RAM 16 by repeated executions of S105 through S108.

To indicate that the telephone number has been completely inputted, the user depresses the "#" key on the numeric pad of the facsimile machine C. When the present facsimile machine 1 receives from the facsimile machine C a DTMF signal for the "#" key (i.e., S106 is YES), in S110 the CPU 12 generates a reception tone at the oscillation circuit (not shown) and outputs the tone to the facsimile machine C. When the user hears the reception tone, at the facsimile machine C, he or she will know that the telephone number for the facsimile machine C will be completely registered.

On the other hand, if the user inputs more than 20 digits, the CPU 12 will generate a rejection tone using the internal oscillation circuit and output the rejection tone to the facsimile machine C, in S109. The rejection tone will inform the user that the inputted telephone number can not be registered. Then, in S118, connection of the line is terminated, whereupon the change forwarding number routine is terminated.

After S110, S111 is performed, in which the CPU 12 rewrites the telephone number already stored in the EEPROM 18 (i.e., telephone number of the facsimile machine B) to the telephone number "0*0123456789" now stored in the RAM 16 (i.e., telephone number of the facsimile machine C). Therefore, the target facsimile machine to which facsimile messages are to be forwarded is changed from the facsimile machine B to the facsimile machine C. Then, in S112, the CPU 12 controls the NCU 36 to temporarily terminate the connection of line. Then, the CPU 12 waits about six seconds, as timed by the timer 26, in S113, ensuring that the external switchboard 50 terminates the line connection between the present facsimile machine 1 and the facsimile machine C. As will be described below, the present facsimile machine 1 will transmit a cover page to the newly-set target facsimile machine for informing that the present facsimile machine 1 has been prepared to forward incoming image information to that new target machine. Because the line connection with the facsimile machine C is terminated at S112 and S113, the cover page will not be transmitted to the facsimile machine C if the telephone number registered in S107 for the facsimile machine C is incorrect.

When six seconds have passed, the CPU 12 controls the NCU 36 to again connect with the interoffice telephone line 40 in S114 so that output toward the telephone line 40 is possible. Then, in S115, the CPU 12 performs to dial the telephone number "0*0123456789" now retained in the EEPROM 18, that is, the telephone number of the newly-set target facsimile machine C. This control process will be referred to as "dialing process" hereinafter.

Figure 3:
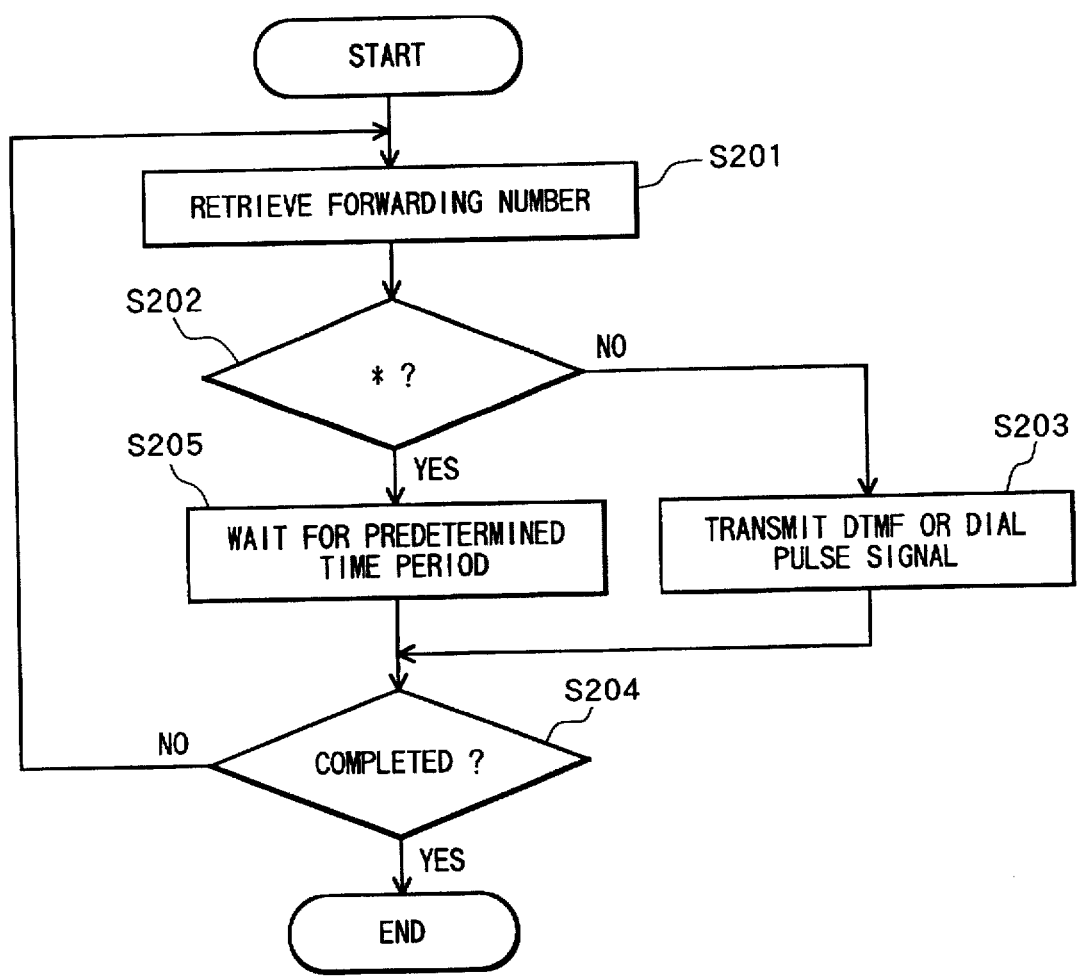
FIG. 3 is a flowchart of a dialing process according to the first embodiment.

The dialing process of S115 will be described while referring to the flowchart in FIG. 3.

In S201, the CPU 12 retrieves the first number of the telephone number now stored in the EEPROM 18. Next, whether or not the first number is the "*" mark or not is determined in S202. Because the first number is the number "0" (i.e., S202 is NO) in this case, the CPU 12 commands the telephone number generation circuit 25 to send a DTMF signal that corresponds to the number "0" to the interoffice telephone line 40, in S203. Upon receiving the DTMF signal for the number "0", the internal switchboard 44 starts connecting the present facsimile machine 1 with the outside telephone line 48. Then, whether dialing is completed or not is determined in S204. Dialing is not yet complete at this point, so the determination in S204 is NO. The program therefore returns to S201, where the "*" mark of the telephone number is retrieved at this stage.

When the "*" mark of the telephone number is retrieved in S201, the determination in S202 will be YES. The present facsimile machine 1 then waits about three seconds, as timed by the timer 26, before retrieving the next number of the telephone number. This three second pause is to ensure that the internal switchboard 44 connects the present facsimile machine 1 to the outside telephone line 48. If the number following the first number "0" is immediately dialed while the present facsimile machine 1 is not yet connected to the external line 48, the number will not be sent to the external switchboard 50 so that the present facsimile machine 1 may not be properly connected to the facsimile machine C. After the predetermined time of three seconds is up as measured by the timer 26, the program proceeds to S204. During dialing is not yet complete (i.e., S204 is NO), the program returns to S201 where the next number is retrieved.

By repeated executions of S201, S202, S203 and S204, the present facsimile machine 1 serially retrieves the rest of the telephone number so that the external switchboard 50 sends a ringing sequence to the facsimile machine C.

Then, in S116 of FIG. 2, the CPU 12 prepares or produces image information for a cover page to be transmitted to the facsimile machine C. It is noted that in addition to the forwarding telephone number described above, the EEPROM 18 holds a facsimile number of the present facsimile machine 1. As can be seen in an example of the cover page shown in FIG. 5, the CPU 12 produces the cover page so that the cover page includes the facsimile number of the present facsimile machine 1 ("0-XXX-XXXX-3333" in this example) in addition to the presently set forwarding telephone number "0-1234556789."Next, the CPU 12 transmits in S117 the prepared image information for the cover page to the facsimile machine C. In response to this, the facsimile machine C will receive and print out the cover page. By receiving the cover page at the newly-designated target facsimile machine C, the user can confirm that the present facsimile machine 1 can correctly forward image information to the newly-designated target facsimile machine. After completion of S117, the program proceeds to S118.

In S118, the CPU 12 controls the NCU 36 to terminate connection of line, whereupon the change forwarding number routine is completed.

Figure 4:
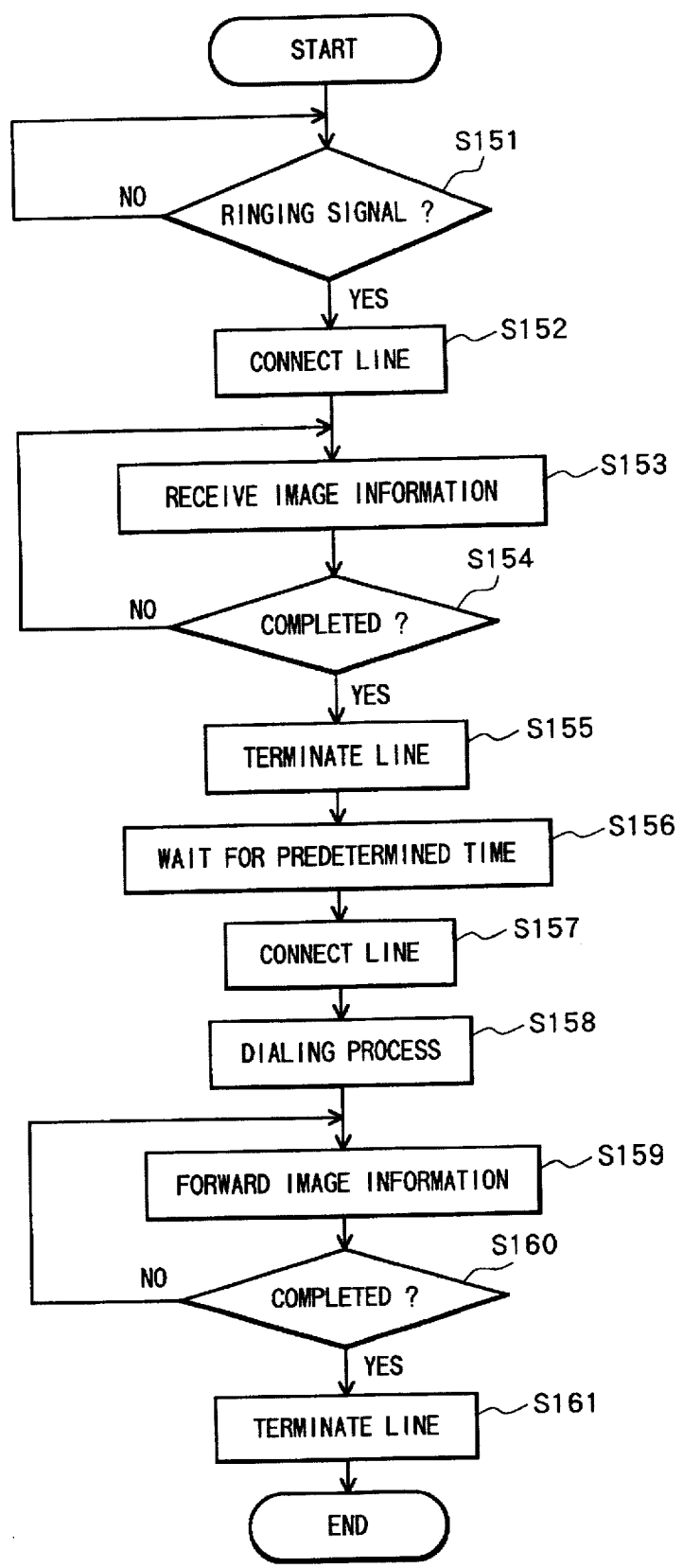
FIG. 4 is a flowchart of an image forwarding process.

Next, an explanation of the image forwarding routine performed for forwarding incoming facsimile data to the target facsimile machine will be provided while referring to flowchart of FIG. 4. As described already, the image forwarding routine is executed after the forwarding number has been recorded by the forwarding number change routine of FIG. 2.

When the present facsimile machine 1 receives a ringing signal from the external switchboard 50 (i.e., S151 is YES), in S152 the CPU 12 controls the NCU 36 to connect with the telephone line 40 and prepares for input from the telephone line 40. Image information transmitted over the outside telephone line 48 and the interoffice telephone line 40 is stored in the RAM 16 in S153 until reception of image information is completed (i.e., S154 is YES), whereupon the CPU 12 controls the NCU 36 to terminate the connection of the line in S155. Then, the CPU 12 waits for a predetermined time period, six seconds for example, in S156.

When six seconds have passed after the reception of image information is completed, the CPU starts performing a process for forwarding the image information to the newly-set target facsimile machine C. That is, the CPU 12 connects the NCU 36 to the telephone line 40 in S157, and performs the dialing process of FIG. 3 so as to dial the telephone number of the facsimile machine C in S158. Then, the CPU 12 forwards the image information stored in the RAM 16. When the forwarding process is completed ("Yes" in S160), the CPU 12 controls the NCU 36 to terminate the line connection in S161, whereupon the forwarding routine is completed.

Figures 5, 6:
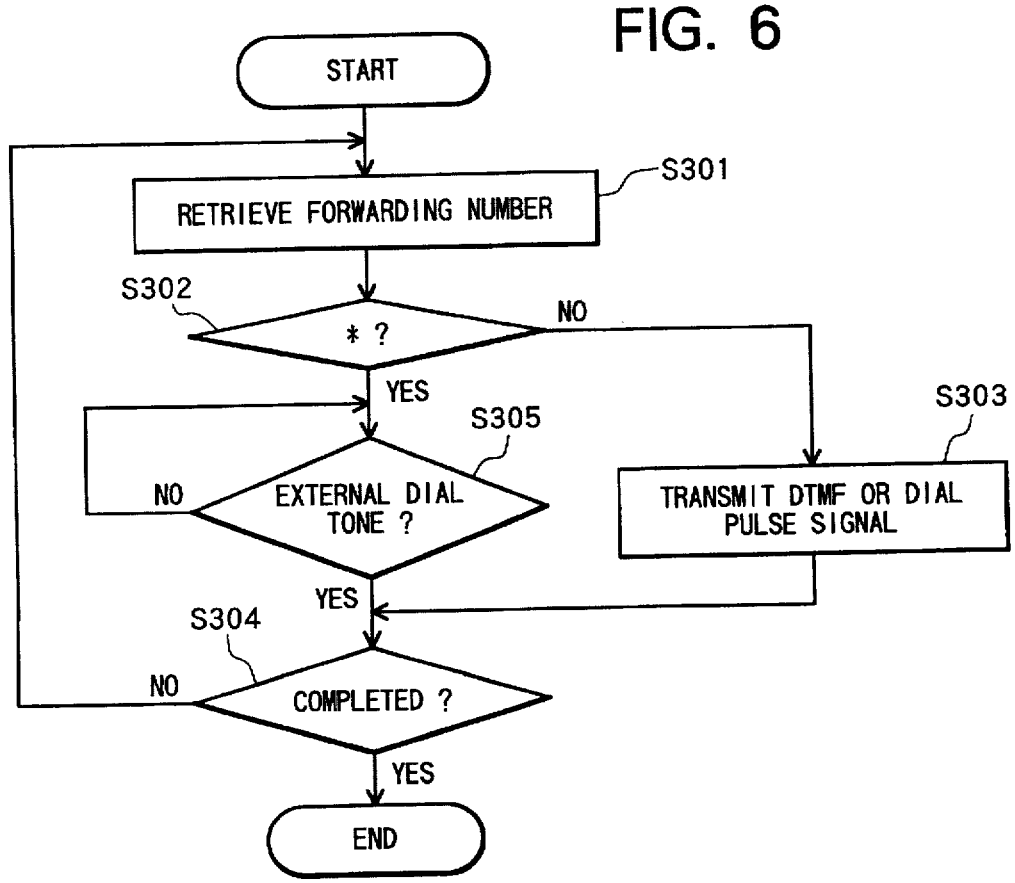
FIG. 5 shows a cover page transmitted according to the first embodiment.
FIG. 6 is a flowchart of a dialing process according to the second embodiment.

A second embodiment will be described below with reference to FIGS. 6 and 7.

The facsimile machine 1 of the second embodiment has the configuration of electrical components the same as that of the first embodiment shown in FIG. 1, except that image information for a predetermined cover page as shown in FIG. 7 is retained in the ROM 20. This cover page can be commonly used. According to the present embodiment, the predetermined cover page of FIG. 7 is transmitted to the newly-set target facsimile machine to enable the user to confirm that the present facsimile machine 1 can properly perform the forwarding function.

The facsimile machine of the present embodiment performs the change forwarding number routine the same as that of the first embodiment shown in FIG. 2 except for the contents of S115 and S116.

The dialing process of S115 according to the second embodiment will be described below with reference to FIG. 6.

Assume that the dialing process is for dialing the forwarding number "0*0123456789" of the facsimile machine C newly set in the EEPROM 18.

In S301, the CPU 12 retrieves the first number of the telephone number for the facsimile machine C stored in the EEPROM 18. Next, whether or not the first number is the "*" mark or not is determined in S302. Because the first number is the number "0" (i.e., S302 is NO) in this case, the CPU 12 commands the telephone number generation circuit 25 to send a DTMF signal that corresponds to the number "0" to the telephone line 40 in S303. Upon receiving the DTMF signal for the number "0", the internal switchboard 44 connects the present facsimile machine 1 with the outside telephone line 48. Whether dialing is completed or not is determined in S304. Dialing is not yet complete at this point, so the determination in S304 is NO. The program therefore returns to S301, where the "*" mark of the telephone number is retrieved.

When the "*" mark of the telephone number is retrieved in S301, the determination in S302 will be YES. It is noted that the internal switchboard 44 continues transmitting a dial tone for an interoffice extension (referred to as "internal dial tone") to the present facsimile machine 1, until when the internal switchboard 44 completes connecting the present facsimile machine 1 with the outside telephone line 48. When the internal switchboard 44 completes connecting the present facsimile machine 1 with the outside telephone line 48, the external switchboard 50 starts transmitting an external dial tone to the present facsimile machine 1. Accordingly, in S305, the CPU 12 waits until the received dial tone changes from the internal dial tone into the external dial tone. In other words, the CPU 12 waits until the internal switchboard 44 completes connecting the present facsimile machine 1 to the external line 48. When the internal switchboard 44 completes connecting the external line 48 and therefore the CPU receives the external dial tone (i.e., "Yes" in S305), the program proceeds to S304 to judge whether dialing is completed. During dialing is not yet complete (i.e., S304 is NO), the program returns to S301 where the next number is retrieved.

By repeated executions of S301 through S304, the present facsimile machine 1 serially retrieves the rest of the telephone number and sends the corresponding DTMF signals to the external switchboard 50, whereupon the external switchboard 50 sends a ringing sequence to the facsimile machine C.

When the dialing process is thus completed in S115 of FIG. 2, the program proceeds to S116 where the CPU 12 simply retrieves the image information of the predetermined cover page of FIG. 7 from the ROM 20.

The facsimile machine of the present embodiment is advantageous in that DTMF signals for the forwarding number are transmitted to the external switchboard 50 only after the internal switchboard 44 completes connecting the present facsimile machine 1 with the external line 48. Because the predetermined image information for the cover page is previously stored in the ROM 20, the image information can be simply retrieved from the ROM 20 to be transmitted to the facsimile machine C. Accordingly, it is possible to transmit the cover page to the facsimile machine C within a short period of time.

Although the above description is directed to the case where the user transmits the command from a new target facsimile machine C. However, the facsimile machine of the present invention can receive forwarding number changing command from any remote information transmitting device. That is, the facsimile machine of the present invention can receive the command from any facsimile machine other than the facsimile machine C and from any telephone. For example, while traveling from location B to location C, the user may telephone the present facsimile machine 1 using a portable telephone D to change the target facsimile machine from facsimile machine B to the facsimile machine C. When arriving at the location C, the user knows that the cover page has been properly transmitted to the facsimile machine C and confirms that the present facsimile machine 1 can properly forward image information to the new target facsimile machine.

As described above, according to the present embodiment, upon receiving a command for changing a forwarding number (Yes in S103), the present facsimile machine 1 receives the forwarding number (S105–S108), and retains the received forwarding number in the EEPROM 18. Then, the present facsimile machine 1 dials the forwarding facsimile machine (S115). The present facsimile machine 1 prepares a cover page for indicating that the present facsimile machine is put into a condition capable of forwarding incoming image information (S116). The facsimile machine 1 transmits the cover page to the forwarding facsimile machine.

Thus, according to the present invention, receiving the cover page from the present facsimile machine, the user can confirm that the present facsimile machine will properly forward image information to the designated target facsimile machine.

There is no need to include a voice circuit or other component for producing a synthetic voice by which the user confirms accuracy of the forwarding number. Therefore the facsimile machine with a forwarding function can be inexpensively provided.

While the invention has been described in detail with reference to specific embodiments thereof, it would be apparent to those skilled in the art that various changes and modifications may be made therein without departing from the spirit of the invention, the scope of which is defined by the attached claims.

What is claimed is:

1. A facsimile machine capable of forwarding image information received from any remote facsimile machine to any desired target facsimile machine, the facsimile machine comprising:

reception means capable of receiving a telephone number of a target facsimile machine, to which image information is desired to be forwarded, and incoming image information transmitted from a remote facsimile machine and desired to be forwarded to the target facsimile machine;

storage means capable of storing the received telephone number of the target facsimile machine;

telephone number signal generating means capable of generating a telephone number signal corresponding to the telephone number of the target facsimile machine stored in the storage means and capable of connecting a telephone line to the target facsimile machine;

image information transmission means capable of transmitting image information to the target facsimile machine through the connected telephone line;

target facsimile machine telephone number input control means for performing a telephone number input control operation in response to receiving the telephone number of the target facsimile machine at the reception means, to control the storage means to store the received telephone number, to control the telephone number signal generating means to generate the telephone number signal corresponding to the telephone number of the target facsimile machine newly stored in the storage means to thereby connect a telephone line to the target facsimile machine, and to control the image information transmission means to transmit, to the target facsimile machine, information on a confirmation image indicating that the facsimile machine capable of forwarding image information is put into a forwarding state capable of forwarding incoming image information transmitted from remote facsimile machines to the target facsimile machine; and image information forward control means for performing an image forward control operation, in response to receiving incoming image information at the reception means after the target facsimile machine number input control means performs the telephone number input control operation, to control the telephone number signal generating means to generate the telephone number signal corresponding to the telephone number of the target facsimile machine, which is presently stored in the storage means, to thereby connect a telephone line to the target facsimile machine and then to control the image information transmission means to transmit the received incoming image information to the target facsimile machine.

2. A facsimile machine as claimed in claim 1, wherein the reception means receives a command for changing a target facsimile machine, a telephone number of which has been already stored in the storage means, into a newly-desired target facsimile machine, to which image information is newly desired to be forwarded, the reception means receiving a telephone number of the newly-desired target facsimile machine after receiving the command, the storage means rewriting the already-stored telephone number with the newly-received telephone number.

3. A facsimile machine as claimed in claim 2, wherein the reception means receives the command and the telephone number of the newly-desired target facsimile machine from a remote information transmission device.

4. A facsimile machine as claimed in claim 3, wherein the reception means receives the command and the telephone number of the newly-desired target facsimile machine from a remote facsimile machine.

5. A facsimile machine as claimed in claim 3, wherein the reception means receives the command and the telephone number of the newly-desired target facsimile machine from a remote telephone.

6. A facsimile machine as claimed in claim 2, further comprising confirmation image information storage means for storing information on the confirmation image indicating that the facsimile machine is put into the forwarding state capable of forwarding incoming image information to the target facsimile machine.

7. A facsimile machine as claimed in claim 2, further comprising confirmation image information preparation means for preparing information on the confirmation image indicating that the facsimile machine is put into the forwarding state capable of forwarding incoming image information to the newly-desired target facsimile machine, the confirmation image information including information on the telephone number of the newly-desired target facsimile machine presently stored in the storage means.

8. A facsimile machine as claimed in claim 2, wherein the storage means stores a pause code together with the telephone number received by the reception means, the telephone number signal generation means generating a telephone number signal corresponding to a number following the pause code at a timing delayed by a predetermined time period from a timing when the telephone number signal generation means has generated a telephone number signal corresponding to a number preceding the pause code.

9. A facsimile machine as claimed in claim 2, wherein the storage means stores a pause code together with the telephone number received by the reception means, the telephone number signal generation means generating a telephone number signal corresponding to a number following the pause code after when the facsimile machine is completely connected to the external telephone line.

10. A facsimile machine as claimed in claim 1, further comprising telephone line connecting means connected to an internal telephone line, the internal telephone line being connected to an internal switchboard, the internal switchboard being connected to an outside telephone line which is connected to an external switchboard, and wherein the reception means receives a connection number code requesting the internal switchboard to connect the internal telephone line to the outside telephone line and a pause code before receiving the telephone number of the newly-desired target facsimile machine, the storage means storing the connection number code, the pause code, and the telephone number.

11. A facsimile machine as claimed in claim 10, further comprising control means for controlling the telephone number signal generation means to serially retrieve, from the storage means, the connection number code, the pause code, and the telephone number, in this order, the control means controlling the telephone number signal generation means to retrieve the telephone number after a predetermined time period has passed from the time when the control means controls the telephone number signal generation means to retrieve the pause code, the telephone number signal generation means, upon retrieving the connection number code, generating a telephone number signal corresponding to the connection number code to cause the internal switchboard to connect the internal telephone line to the outside telephone line, the telephone number signal generation means, upon retrieving the telephone number, generating a telephone number signal corresponding to the telephone number to cause the external switchboard to connect the outside telephone line to the target facsimile machine.

12. A facsimile machine as claimed in claim 10, further comprising controlling means for controlling the telephone number signal generation means to serially retrieve, from the storage means, the connection number code, the pause code, and the telephone number, in this order, the telephone number signal generation means, upon retrieving the connection number code, generating a telephone number signal corresponding to the connection number code to cause the internal switchboard to connect the internal telephone line to the outside telephone line so as to connect the facsimile machine to the external switchboard, the external switchboard transmitting a dial tone to the facsimile machine when being completely connected to the facsimile machine, the control means controlling the telephone number signal generation means to retrieve the telephone number after when the control means receives the dial tone from the outside switchboard, the telephone number signal generation means, upon retrieving the telephone number, generating a telephone number signal corresponding to the telephone number to cause the external switchboard to connect the outside telephone line to the target facsimile machine.

13. A facsimile machine as claimed in claim 1, further comprising image information storage means for temporarily storing the received incoming image information, the image information transmission means transmitting the incoming image information, stored in the image information storage means, to the target facsimile machine.

\* \* \* \* \*